Nov. 19, 1968

D. V. CRONIN 3,412,256

OPTICAL ENCODER USING COMMON LIGHT SOURCE
WITH BEAM SPLITTER MEANS

Filed Oct. 30, 1964

INVENTOR
DAVID V. CRONIN
BY Weingarten, Grenbuck & Lahive
ATTORNEYS

INVENTOR
DAVID V. CRONIN
BY Weingarten, Orenbuch & Lahive
ATTORNEYS

Nov. 19, 1968

D. V. CRONIN 3,412,256

OPTICAL ENCODER USING COMMON LIGHT SOURCE
WITH BEAM SPLITTER MEANS

Filed Oct. 30, 1964

*INVENTOR.*
DAVID V. CRONIN
BY
Weingarten, Arenbuch & Lahive

ATTORNEYS

United States Patent Office 3,412,256
Patented Nov. 19, 1968

3,412,256
OPTICAL ENCODER USING COMMON LIGHT
SOURCE WITH BEAM SPLITTER MEANS
David V. Cronin, West Peabody, Mass., assignor to
Dynamics Research Corporation, Stoneham, Mass.,
a corporation of Massachusetts
Filed Oct. 30, 1964, Ser. No. 407,753
9 Claims. (Cl. 250—231)

ABSTRACT OF THE DISCLOSURE

An optical shaft encoder in which a single illumination source provides a plurality of light beams which uniformly illuminate respective areas of a pair of ruled discs. Light from a centrally located source is directed via transverse passageways and lenses in a unitary housing to respective reflective surfaces of the housing which direct the light to predetermined portions of the ruled discs.

This invention relates generally to electromechanical transducers and more particularly to an improved photoelectric shaft position encoder incorporating an electrooptical system to provide highly accurate output indications of the amount of rotation of a shaft.

Encoders for providing an output indication of the amount of rotation of a shaft are widely known and may be found incorporated in a wide variety of applications, particularly in general positional devices such as inertial navigation equipment and the like. One type of encoder now in use employs a pair of discs each having a series of alternately light transmissive and opaque sectors radially disposed about its center and extending to its periphery. One such disc is mounted on a shaft, whose rotation is to be determined, while the other disc is mounted concentrically with the shaft but mechanically fixed to a reference point. Rotation of the shaft then occasions modulation of a light beam passed through both discs to photosensitive sensors. The electric waveforms at the output of the sensor are indicative of the amount and direction of shaft rotation.

Such devices frequently are dual channel devices and use a multiplicity of light sources each of which is in combination with a respective sensor. Each channel of such a device generally comprises a pair of sensor stations where each station consists of an incandescent lamp and a photocell having a stationary and a rotary reticle interposed between a lamp and its respective photocell. Often the stations are located at opposite ends of the diameter of the reticle. The signals from each station are connected in phase opposition. Thus such a channel corrects for so-called radial runout which is caused by misalignment of the rotary disc with respect to the stationary disc. Utilization of such multiple illumination sources, however, increases the probability of system failure since the system fails if any single lamp fails, hence the use of four lamps quadruples the probability of failure.

Such lamps radiate light in all directions and in prior art encoders only a small fraction of the light so radiated was utilized. Since such lamps are thermionic they require a considerable amount of power for proper operation and thus failure to utilize all of the light or a substantial portion of the light generated represents a waste of power. Further, as is well known, use of any such thermionic device, generates heat and the use of four lamps quadruples the amount of heat produced in the unit. This heat also represents a considerable waste of power and significantly shortens the life expectancy of the encoder, the component parts and associated equipment.

Still further since the sensivity of the combination of lamp and photocell is directly related to the accuracy of the encoders, great care must be taken in adjusting the position of the light sources and in matching the sources with their respective photosensors. Such matching is not only difficult but also time consuming and can, if not properly matched, introduce a significant variation in the final output. However, even when such matching has been accomplished, it is virtually impossible to arrange for equal degradation of such source over a period of time. Hence they remain matched only for a short period of their life.

The present invention eliminates these and other problems by providing an optical arrangement whereby a single lamp is used to provide identical beams of light through the individual reticles to a plurality of photosensors. Utilization of such a single lamp results in improved reliability of the entire system and greatly reduces the power requirement of the device. For example, the power consumption of the present invention is only one-eighth to one-quarter that is required of the prior art devices using multiple illumination sources. Such dramatically reduced power consumption eliminates a significant amount of heat, thus providing an encoder that can operate in a given environment at a significantly lower temperature. This feature not only enhances the performance and lengthens the life of the encoder itself but is also advantageous for other equipment which may have to operate close to the encoder.

Other advantages and features will become apparent from the following detailed descriptions when taken in conjunction with the accompanying drawings in which.

Figure 1:
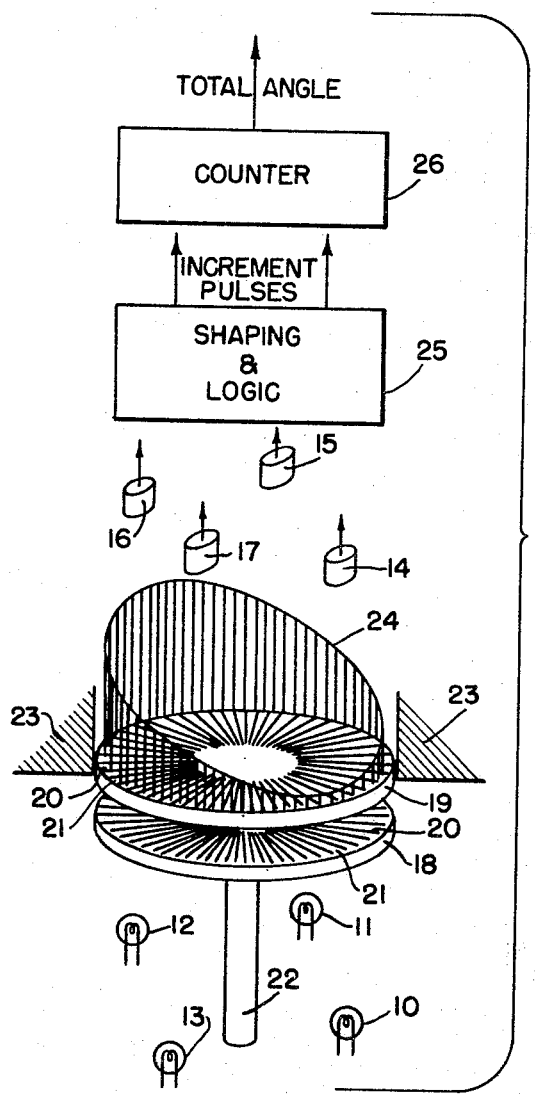
FIG. 1 is a simplified schematic or a prior art optical encoder.

The optical encoder shown schematically in FIG. 1 has four light sources, 10, 11, 12, and 13, placed 90° apart with corresponding photosensors 14, 15, 16, and 17. Interposed between the sources and the sensors are two transparent discs 18 and 19 each having ruled patterns of opaque sectors 20 alternated with clear sectors 21. One disc 18 is mounted on a rotating shaft input 22 while the other disc 19 is permanently fixed to the housing 23. When the disc 18 is rotated and light is passed through both discs 18 and 19, a moiré fringe 24 is generated with maximum light transmitted through one region while 180° away illumination is at a minimum. Thus, as illustrated in FIG. 1, photocell 14 would be receiving minimum illumination while photocell 16 would be receiving maximum illumination and photocells 15 and 17 would be receiving half the amount of illumination received by photocell 16. A full revolution of the input shaft 22 causes the moiré pattern 24 to rotate a number of times equal to the number of ruled lines 20 to provide an optical gearing effect.

The variant signal emitted from the photosensors can be fed to shaping and logic circuits 25 and, depending upon the output circuit used, one or more pulses can be generated for each full revolution of the moire of shaft revolution. A simple up and down counter 26 may be used to accommodate pulses from network 25 to generate a total angle code. A zero reference signal can also be supplied if desired.

In such devices the lamps 10, 11, 12 and 13 should be perfectly matched so as to generate substantially the same amount of illumination. Simultaneously the photosensors 14, 15, 16 and 17 must also be matched so as to have an identical output whenever illuminated by the same strength illumination.

Such matching of the lamps and the photocells is required since if any lamp or cell varies in its output the encoder will see such a variation as an error signal. In many instances the introduction of such a variation or error signal completely destroys the usefulness of the system even though the system is still operable. In other words, even though the device still functions and puts out a signal, the signal so put out is so erroneous as to be meaningless. The photosensors 14, 15, 16 and 17 can be matched quite accurately and will generally retain this accuracy for the life of the device. However, with age, the lamps tend to become erratic in their performance and widely different in their output so that the device does not function properly. Further the failure of any individual lamp causes the failure of the entire encoder.

Utilization of four separate illumination sources further requires a large power input and results in increased heat dissipation once again leading to reliability problems since, as is well known in the field of reliability, increased heat in an electronic component such as the present device results in a degradation of the characteristics of each of the component parts thereof.

Figure 3:
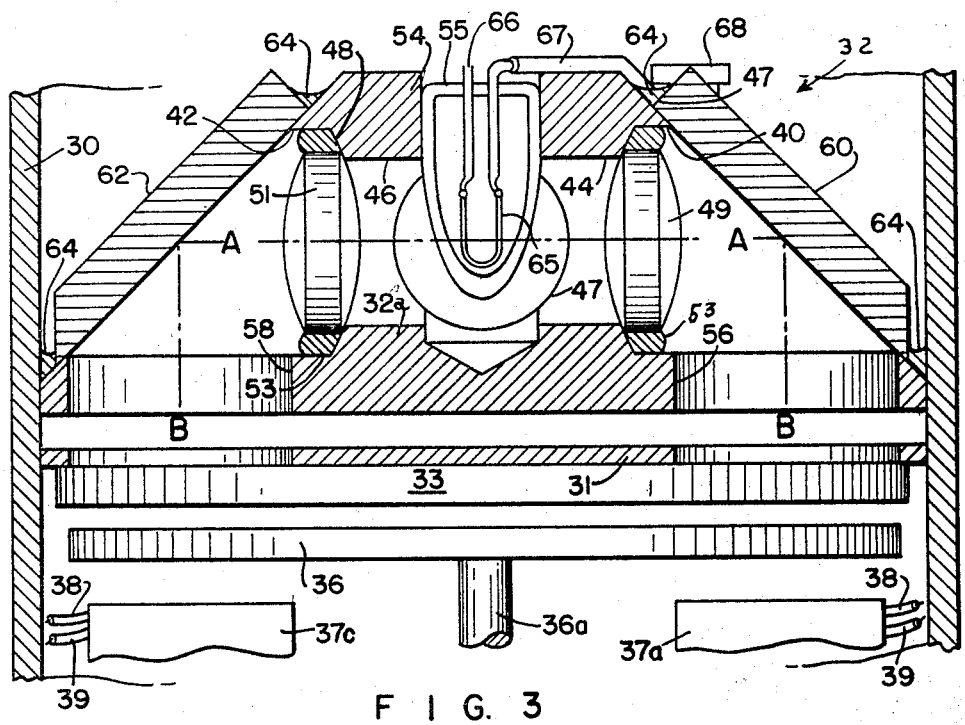
FIG. 3 is a sectional view of FIG. 2 taken along the line 3-3.
Figure 2:
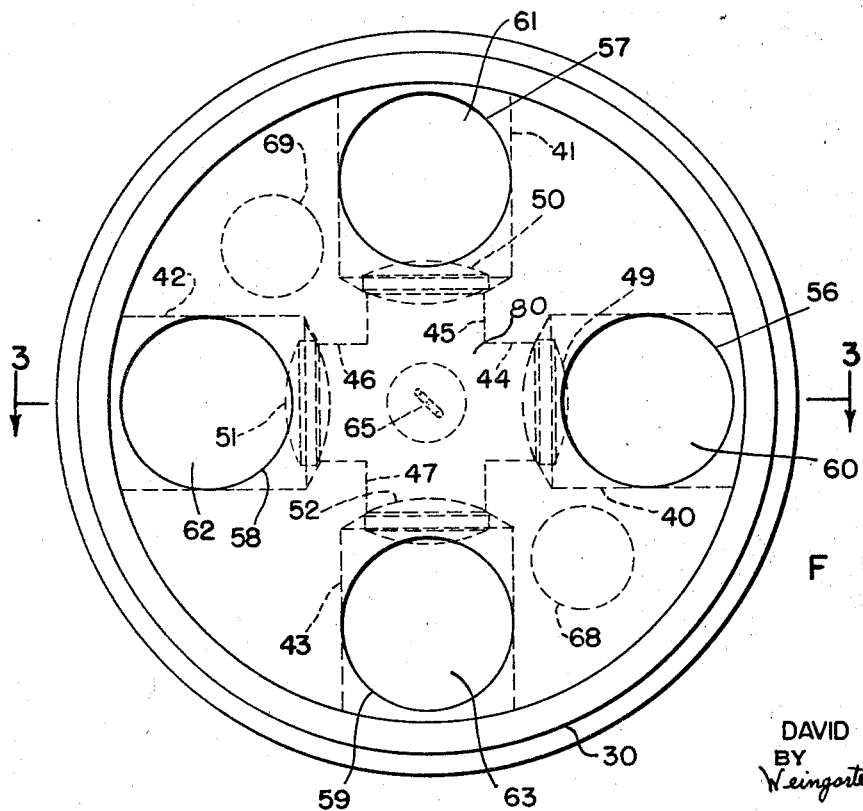
FIG. 2 is a plan view of an improved transducer constructed in accordance with the principles of this invention.

FIGS. 2 and 3 disclose the specific mechanical and optical arrangements of an encoder incorporating the present invention. All electrical, mechanical and optical elements of the device are completely enclosed within a cylindrical housing 30 formed with suitable electrically insulated openings (not shown) through which the electrical connections to the various components contained therein may be made.

Housing 30 is preferably a machined part of cylindrical configuration provided with a support member 31 to which the optics assembly 32 and the stationary reticle 33 are secured. If desired, the optics assembly 32 may be secured to the housing 30 by screws, fastenings or the like. The stationary reticle 33 may be maintained in a fixed position by the use of a suitable adhesive. A rotary disc 36 having a shaft 36A fixed to the center thereof is situated adjacent but not touching the stationary reticle 31 on the side opposite assembly 32 and secured in housing 30 by a bearing assembly (not shown). A plurality of photocells 37 having appropriate electrical connections 38 and 39 thereto are located in fixed position below the rotary reticle 36.

The optics assembly functions as a means of delivering to the photocells from a single source a plurality of beams uniform in their intensity. This derivation of a plurality of beams of equal and uniform intensity eliminates the possibility of the introduction of an error signal due to variation in output intensity caused by the erratic functioning of any individual lamp. Thus even if the single lamp used in the assembly varies in its output due to age or other factors, the beams, as detected by the photocells, will still be of uniform and equal intensity. This unique assembly thus eliminates a serious failing of the prior art and greatly prolongs the life of the encoder. The only factor that will end the useful life of an encoder using this novel optics assembly is the complete and catastrophic failure of the lamp. The use of the assembly and a single lamp further provides a means for reduction of heat in the unit and permits the use of a significantly smaller power supply.

The optics assembly 32 comprises a single unitary body 32a. Preferably the body 32a comprises a short body generally in the form of a cylinder terminating in a truncated pyramid and formed of an easily worked light material such as aluminum. The body 32a has provided therein a series of radial passageways 40, 41, 42 and 43 passing towards the center thereof. These passageways are thus transverse to, directed towards, and meet at the vertical axis of the assembly 32 to form central chamber 80. Although the passageways are shown as passing at equal angles towards the axis, they can be separated by varying angles. All that is being required is that they be directed towards the center or axis of the assembly 32.

Preferably the passageways are not of the same size throughout but have reduced portions 44, 45, 46 and 47. These reduced portions extend outwardly from chamber 80 a predetermined distance and terminate abruptly forming a plurality of steps 48. The steps 48 provided at the junctions of the passageways and their reduced portions serve as supports against which a plurality of lenses 49, 50, 51 and 52 may be fixedly secured by any convenient means such as an adhesive 53.

An axial opening 54 is provided in the upper surface of body 32a and in line with central chamber 80. This opening 54 extends into the central chamber 80 and is made of sufficient size so as to be suitable for the insertion of an illumination source such as miniature lamp 55.

The wall of the assembly is provided with beveled flat portions aligned with the passageways 40, 41, 42 and 43. On each such flat bevel a reflector is fixedly secured. Thus in line with passageways 40 through 43 are a plurality of mirrors 60, 61, 62 and 63 secured by an adhesive 64.

Additional axial longitudinal passageways or openings 56, 57, 58 and 59 are provided in the lower surface of the assembly 32 and interconnect with passageways 40, 41, 42 and 43. These additional axial openings are aligned with the photosensors 37, and with the mirrors 60, 61, 62 and 63.

The illumination from the source 55 thus can simultaneously travel down each of the passageways 40, 41, 42 and 43 to the respective mirrors 60, 61, 62 and 63 where it will be reflected at an angle such that parallel beams pass through the openings 56, 57, 58 and 59.

The illumination source being a miniature lamp, it has a filament 65 located in the center thereof which is excited by electricity fed thereto by means of conductors 66 and 67 appropriately connected to terminals 68 and 69 which in turn are connected to a suitable power supply (not shown). Because such lamps have a filament of finite size they do not act as point sources. Therefore it is preferable to place the lamp in the central cavity so that the filament 65 is at an angle of approximately 45° to the axis of the transverse passageways.

When the assembly is constructed as shown in FIGS. 2 and 3 the lenses 49 through 52 are evenly spaced around the lamp 55 while the mirrors 60 to 63 are set at an angle and positioned such that a light beam travelling down the passageway 43 will be bent at an angle so as to pass through the openings 56 through 59.

This is illustrated more fully by the following. Assuming excitation of the filament 65, then light from it travels in all directions radially outward with a portion travelling down each passageway 44, 45, 46 and 47 through the respective lenses 49, 50, 51 and 52 to the mirrors 60, 61, 62 and 63 where it is reflected to pass four parallel beams of light through openings 56, 57, 58 and 59 and reticles 33 and 36 to the photocells 37 located opposite openings 56, 57, 58 and 59. Thus as shown in FIG. 3, light from the filament travels along the line A—A down passageways 40 and 42 through lenses 49 and 51 to be bent at mirrors 60 and 62 whereupon it then travels along the line A—B through openings 56 and 58 to ultimately strike photocells 37A and C.

Therefore an encoder incorporating the novel and unique features of the described invention eliminates the failings of the prior art, prolongs the useful life and increases the reliability of the device by always delivering to the photosensors light beams of equal intensity, by reducing the amount of heat generated and by the lessening of the amount of power required.

This completes one preferred embodiment of the invention. However, many modifications of the present invention may be readily conceived by one skilled in the art. For example, it is not necessary to the present invention that the passageways with their respective mirrors or lenses be symmerically spaced about lamp 55. Such dissymmetry can be compensated for varying the position of the lenses and mirrors. Further, the device could utilize more or less than four parallel light beams as depicted in the present embodiment.

Figure 4:
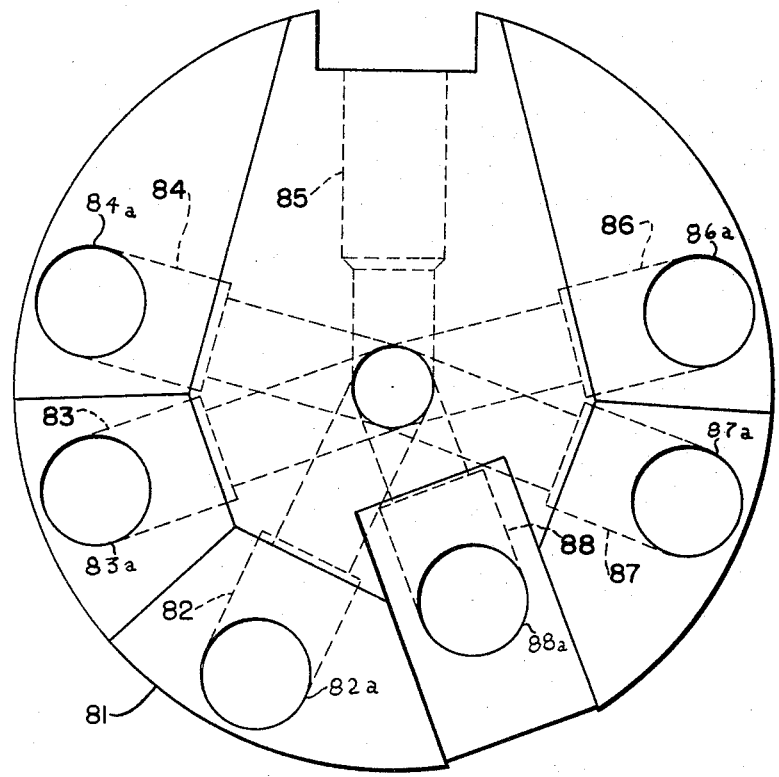
FIG. 4 is a schematic illustration of a different embodiment of the present invention.

One embodiment of the present invention having such disssymmetries is shown in FIG. 4 and comprises an optics assembly having radial passageways converging on the center at dissimilar angles. Such an assembly would be maintained and secured in an optical encoder as previously described in conjunction with FIGS. 1, 2 and 3. This embodiment comprises a single cylindrical unitary body 81 having provided therein a series of radial passageways 82, 83, 84, 85, 86, 87 and 88, all of which have reduced portions. The abrupt junctions joining the reduced portions and the central chamber are both described in conjunction with FIGS. 2 and 3. Appropriate openings 82A, 83A, 84A, 85A, 86A, 87A and 88A interconnecting the passageways as previously described are also provided. On the surface of the body 21 there is again provided a plurality of beveled portions wherein suitable reflectors may be adequately secured. As previously described lenses are abutted to the abrupt junctions occurring where the passageways are reduced.

It should be noted in particular that, in this embodiment, passageways 82, 83, 84, 86 and 87 are of equal length and have lenses placed at a uniform distance from the center of the body. However, passageways 85 and 88 are distinctly different in length and in size. If desired, for example, passageways 85 could be provided with a photosensor so that the sensitivity of the lamp could be directly measured at all times without passing the light through the reticles of the encoder device. Passageways 88 may be so positioned in order to determine another feature or to detect variation in homogeneity of the discs provided in the reticle.

In such a device the lenses in passageways 82, 83, 84, 86 and 87 would be one focal length, while the lenses in passageways 85 and 88 would be a different focal length in order to compensate for the disparagy in the length of the passageways. Thus it is illustrated that the invention can be utilized in a number of configurations.

Figure 5:
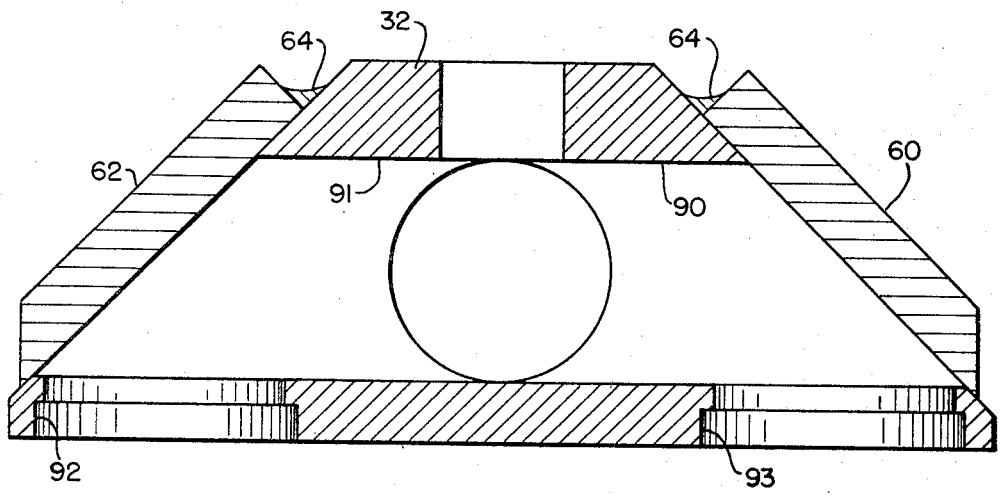

A further embodiment of the present invention is depicted in FIG. 5 where the lenses have been displaced from the position shown in FIGS. 2, 3, and 4. In this embodiment the axially transverse passageways 90 and 91 are of equal size throughout. Interconnecting openings 92 and 93 which intercept the transverse passageways 90 and 91 at right angles as previously described are provided with an abrupt junction against which a lens may be nested. In all other respects the device would be substantially that shown in FIG. 2 with mirrors and illumination sources.

Figure 6:
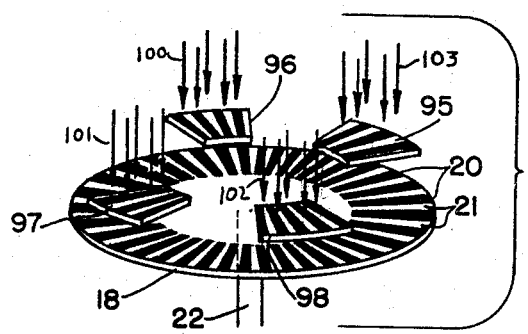
FIGS. 5 and 6 illustrate still different embodiments of the present invention.

Still another embodiment of the present invention is depicted in FIG. 6 in which a plurality of individual patches 95, 96, 97, and 98 having the alternately transparent and opaque sectors 20 and 21 are substituted for the stationary reticle 33. These individual patches are adequately secured to the enclosing wall 30 as previously described. Each of these patches is positioned over the rotary reticle 18 having a shaft 22 secured to the center thereof. In each instance the patches 95, 96, 97, and 98 would be aligned with the parallel beams of light depicted by arrows 100, 101, 102, and 103. These patches need only extend across the appropriate and respective light beam and need not be placed in the intervening dark areas between the light beams. Utilization of such patches results in increased sensitivity and position determining aspects of the entire encoder device.

This completes a description of several embodiments of the invention and since further modifications and variations in the device may become apparent to those skilled in the encoder art, it is respectively requested that the invention should be limited only by the appended claims.

What is claimed is:

1. An electromechanical transducer comprising a first and second reticle each having a plurality of equiangular sectors alternately opaque and transmissive, a single illuminating source provided in said transducer, means for directing uniform light beams from said illuminating source through a multiplicity of points on said first and said second reticles, and means positioned in and responsive to said light beams wherein said responsive means are excited in a pattern corresponding to modulation of said light beams by the rotation of said first reticle, and light directing means comprising a unitary body of generally cylindrical configuration terminating in a truncated multifaceted pyramid having a series of axially transverse passageways formed therein and intersecting the faces of said pyramid, said passageways further having reduced portions terminating in an abrupt junction and joining together in a central cavity located on the cylindrical axis of said body, a plurality of axial passageways interconnecting said axially transverse passageways, at least one of said passageways being located on the axis of said body and entering said central cavity, said illuminating source being located partially in said axial opening and partially in said central cavity, lenses located in said transverse passageways and abutted against said abrupt junction, said lenses being fixedly secured to the faces of said pyramid, said reflectors being at an angle so as to direct light from said source traveling down said passageways and through said lenses, through said axial passageways intersecting said axially transverse passageways and thence onto respective responsive means.

2. An electromechanical transducer as described in claim 1 wherein said two multiplicity of points are separated by 180° and said corresponding light responsive means are interconnected to provide signals of opposing polarity.

3. An electromechanical transducer comprising a first and second reticle each having a plurality of equiangular sectors alternately opaque and transmissive, a single illuminating source provided in said transducer, means for directing four uniform light beams from said illuminating source through said first and said second reticles, said beams being separated from each other by 90°, and means positioned in and responsive to said light beams wherein said responsive means are excited in a pattern corresponding to modulation of said light beams by the rotation of said first reticle, said light directing means comprising a unitary body of generally cylindrcal configuration terminating in a truncated four-faceted pyramid having four axially transverse main passageways formed in said body and passing therethrough and intersecting the four faces of said pyramid, said passageways further having reduced portions, said reduced portions forming with said passageways an abrupt junction, said reduced portions joining together to form a central cavity located on the cylindrical axis of said body, a plurality of axial longitudinal openings interconnecting said passageways, at least one of said openings being located on the axis of said body and entering said central cavity, said illuminating source being located partially in said central axial opening and partially in said central cavity, lenses located in said transverse passageways and abutted against said abrupt junction, said lenses being fixedly secured to said junctions and reflectors fixedly secured to the faces of said pyramid, said reflectors and said faces being at an angle of 45° so as to direct light from said source, travelling down said passageways and through said lenses, through said axial openings intersecting said passageways, said openings being positioned over said responsive light means.

4. In an electromechanical transducer comprising a pair of discs each having alternately light transmissive and opaque sectors radially disposed thereon, and mounted concentrically for relative rotation therebetween, and a plurality of photosensors positioned on one side of said discs in a predetermined angular spacing to sense light passing through said discs and modulated by the relative movement of said discs;
- an illumination assembly mounted on the other side of said discs and operative to provide a like plurality of light beams which are directed through said discs onto respective photosensors, said illumination assembly comprising:
- a housing disposed on the side of said discs opposite said photosensors and having a cavity formed within said housing and centrally located therein;
- a lamp disposed in said central cavity;
- a plurality of inclined faces disposed around the perimeter of said housing, each inclined face having a reflective surface in light transmitting relationship with a respective photosensor;
- a plurality of physically distinct axially transverse passageways formed in said housing and extending between said central cavity and respective ones of said inclined faces, whereby a like plurality of light beams from said lamp is directed through respective passageways onto respective inclined faces; and
- a plurality of physically distinct axial passageways formed in said housing, each communicating with a respective inclined face and being in light transmitting relationship with a respective photosensor, whereby each of said light beams reflected by said inclined faces is directed through respective axial passageways onto respective photosensors.

5. The invention according to claim 4 wherein said housing is of generally cylindrical configuration and is disposed adjacent said discs with said central cavity located on the cylindrical axis of said housing.

6. The invention according to claim 4 wherein said housing is of generally cylindrical configuration and is disposed adjacent said discs with said central cavity located on the axis of said discs.

7. The invention according to claim 4 wherein said central cavity is symmetrically disposed on the axis of said discs, said axially transverse passageways are disposed radially of said discs, and said inclined faces are angularly mounted with respect to said axially transverse passageways and said axial passageways to direct each of the light beams reflected by said inclined faces through said discs in a direction substantially orthogonal to the plane of said discs.

8. An electromechanical transducer according to claim 4 wherein said plurality of transverse passageways, axial passageways, inclined faces and lenses numbers four.

9. An electromechanical transducer according to claim 4 further including a plurality of lenses each located in a respective transverse passageway adjacent said central cavity.

References Cited
UNITED STATES PATENTS

| | | | |
|---|---|---|---|
| 2,871,370 | 1/1959 | Neubrech et al. | 250—220 |
| 3,096,444 | 7/1963 | Seward | 250—231 |
| 3,227,887 | 1/1966 | Messelt et al. | 250—220 |
| 3,309,525 | 3/1967 | Johnson | 250—23 |
| 2,547,212 | 4/1951 | Jamison et al. | 88—14 |

RALPH G. NILSON, *Primary Examiner.*

M. ABRAMSON, *Assistant Examiner.*